No. 708,291. Patented Sept. 2, 1902.
B. A. ALLISON.
INVOICE AND BALANCE SHEET.
(Application filed July 29, 1901.)

(No Model.) 3 Sheets—Sheet 1.

Fig. 1.

No. 708,291.

Patented Sept. 2, 1902.

B. A. ALLISON.
INVOICE AND BALANCE SHEET.
(Application filed July 29, 1901.)

(No Model.)

3 Sheets—Sheet 2.

Fig. 2.

Witnesses
J. H. Imure
Gladys L. Thompson.

Inventor
B. A. Allison
By R. V. A. B. Lacey
Attorneys

No. 708,291. Patented Sept. 2, 1902.
B. A. ALLISON.
INVOICE AND BALANCE SHEET.
(Application filed July 29, 1901.)

(No Model.) 3 Sheets—Sheet 3.

Fig. 3.

B. A. Allison, Inventor

Witnesses
Gladys L. Thompson

By R. S. & A. B. Lacey, Attorneys

UNITED STATES PATENT OFFICE.

BENJAMIN A. ALLISON, OF McPHERSON, KANSAS.

INVOICE AND BALANCE SHEET.

SPECIFICATION forming part of Letters Patent No. 708,291, dated September 2, 1902.

Application filed July 29, 1901. Serial No. 70,107. (No model.)

*To all whom it may concern:*

Be it known that I, BENJAMIN A. ALLISON, a citizen of the United States, residing at McPherson, in the county of McPherson and State of Kansas, have invented certain new and useful Improvements in Invoice and Balance Sheets; and I do hereby declare the following to be a full, clear, and exact description of the invention, such as will enable others skilled in the art to which it appertains to make and use the same.

This invention aims to facilitate the keeping of accounts and balances, so that the condition of a business in all its branches may be quickly ascertained. This applies to the stock on hand in every line, the amount disposed of, and the cash receipts.

While the invention is susceptible of general use, yet it is only practicable where the list of articles is small.

The invention is particularly designed for use of postmasters and postal clerks who receive postal matter—such as stamps, envelops, cards, and the like—for sale and are required to render an account therefor at stated times and which accounts are subject at any time to the auditing of an inspector or other officer. Hence the sheets are laid out with this particular purpose in view, although the headings may be changed when adapting the invention to other business without departing from the vital principles thereof.

The invention possesses the following advantages: It is a perfect daily balance of postal funds. It is a perfect daily balance of all stamps and stamped paper. It is a daily presentation of the number and amount of each denomination on hand at close of business, thus enabling a postmaster to see at a glance whether his stock, of any denomination, is running low, thus obviating the practice of borrowing from neighboring postmasters and the annoyance to the Department and patrons by a timely requisition. It is a daily correction of all entries from the daily-sale slip. It contains daily a full statement of the postal funds and supplies, such as is required to be submitted monthly to the Department. It is a daily invoice of stock. It is a mechanical process and obviates any computation a second or third time in order to be sure of accuracy. It saves much valuable time to post-office inspector, as the invoice is always complete with amounts noted, leaving him nothing to do but verify same and count the cash, doing away with all fumbling and recounting of stamps and other stock and tedious calculations of the amount of cash that should be on hand. This last feature alone would save the Department much money by reducing the number of inspectors, as there would ordinarly be no occasion for more than an hour's time in the inspection of an office where this record is kept and inspectors made familiar with same. It is almost impossible to go wrong in keeping this record, as there is a balance at every step.

There is now a record furnished by the Department for the entry of the amounts of the daily sales (each day) of each denomination taken from these daily-sale slips referred to; but this is a simple record of these amounts and also a record of any error that may have been made by the sale clerk, for there is nothing to prevent such errors from finding their way into this old record, as there is no check whatever. This system corrects all erroneous entries on the daily-sale slip and prevents their entry upon the proposed record.

In the drawings, Figure 1 represents one of the sheets for postage-stamps of different denominations solely. Fig. 2 represents another or second sheet for miscellaneous matters, such as due-stamps, special-delivery stamps, cards, and the like. Fig. 3 represents another or third sheet for envelops, wrappers, stamp-books, and the like.

The sheets are similarly ruled into vertical and horizontal spaces, the vertical spaces having proper headings and the horizontal spaces corresponding to the days of the month and subdivided to indicate the number and the amount of any article in reserve, the number placed on sale, the balance from previous day, the number sold, and the balance on hand at the close of business on any day.

Referring to sheet 1, the vertical columns are designated by the denomination of postage-stamps to be invoiced thereunder—such as one-cent, two-cent, three-cent, and the like. The first column to the left is for the year, months, and days of the month, and the last column to the right is for the total daily sales of the stamps of all denominations. The vertical columns are each subdivided into three columns—one for the number of stamps on hand, the other for the daily sales, and the third for the amount. The horizontal spaces are ruled alike and the horizontal subdivisions are designated by the letters "A," "B," "C," "D," and "E." The second sheet is used for invoicing special-delivery and due stamps and postal cards and also contains columns for the total sales in any day of stamps, cards, and stamp-books, envelops, cash, and long and short cash, the last-mentioned columns being at the right hand of the sheet. Sheet 3 is used for keeping an account of envelops, wrappers, and stamp-books, the different sizes and denominations of envelops being kept under separate heads. First, the paper is ruled vertically to show each denomination of stamps and stamped paper; second, subruled to show number and amount of daily sales, total amount, &c.; third, horizontally, showing dates, &c. "A" is the number of any denomination on deposit, (in safe or bank.) "B" is the number drawn from deposit for sale on any date. "C" is the balance of previous day remaining on sale at general-delivery or stamp window brought forward. "D" is the number sold on any date. "E" is balance remaining on sale at close of business on any date. "X" is the total number on deposit and balance on sale at close of business on last day of any month. "F" is simply space for adding up amount sales of any date. Take June 1, for example. The item "$24.83" is the amount of sales of all denominations on that date on sheets 1 and 2. The amount "74" denotes total sale of stamp-books, (see sheet 3;) the next item, "$1.37," the sale of stamped envelops on that date, (see "N," sheet 3.) The item "$26.94" is total daily sales as noted at "I," sheet 2. The use of space "F" may be dispensed with, columns "G," "H," and "I" covering same thing; but as space "F" is in use it is explained. "G" is sales of stamps, due-stamps, cards, and stamp-books on any date. "H" is sales of stamped envelops and wrappers on any date. "I" is total sales on any date. "J" is cash at close of business on any date. "K" is long and short cash. "L" is amount of daily sales of any denomination at end of each half-month. "M" is amount of stamp-book sales, (sheet 3.) "N" is amount of envelop sales, (sheet 3.) First, enter at "A" the number of each denomination on deposit, (for example, twenty-one thousand one-cent stamps, June 1, &c.;) second, enter at "C" the number of each denomination, balance on sale of preceding day at close of business, (as five hundred and sixteen one-cent stamps, June 1;) third, enter the amount, under proper column, to the right, as "$215.16," June 1. These items "A" and "C" then stand out alone at close of day's business, with no other items to confuse the eye, a complete invoice of each denomination, in number and amount. For example, see date 16th at bottom of sheet 1.

On deposit................. 17,500
On sale..................... 385
                            ─────
Total................. 17,885

So it is with each denomination, and by multiplying the total by the stamp denomination the amount is given, as in this case it is one hundred and seventy-eight dollars and eighty-five cents. This feature is of vital importance in expediting the auditing of accounts by inspectors and other officers and enables the postmaster or clerk to ascertain at a glance the amount of stock on hand, since it can be found at "A" and "C" on any date at close of business. The total of "A" and "C" at the end of the first half of a month is indicated at "Y." The difference between the amount on hand, as indicated at "X" at the head of a column, and the amount remaining at the end of any period of time, as half-month, and indicated at "Y," corresponds to the total sales for the said period, which is noted at "Z," and this amount multiplied by the stamp denomination verifies the amount of daily-sale column for the said half-month, as at "L."

Having thus described the invention, what is claimed as new is—

1. An invoice and balance sheet having vertical columns provided with headings for designating kinds of goods or stock, and having the vertical columns subdivided into other vertical columns having headings to indicate quantity of goods on sale, the total value of goods disposed of daily and the total value of the goods on hand at the close of each day's business, and having the series of vertical columns intersected by horizontal lines corresponding to the days of the month and having classifying-spaces for the goods handled on each day of the month, substantially as specified.

2. An invoice and balance sheet having vertical columns provided with headings for designating kinds of goods or stock, and having the vertical columns subdivided into other vertical columns having headings to indicate quantity of goods on sale, the total value of goods disposed of daily and the total value of the goods on hand at the close of each day's business, and having the series of vertical columns intersected by horizontal lines corresponding to the days of the month and having classifying-spaces for the goods handled on each day of the month, and a vertical total daily-sales column intersecting the horizontal spaces corresponding to the days of the month for summarizing the daily sales of all kinds of goods, substantially as described.

In testimony whereof I affix my signature in presence of two witnesses.

BENJAMIN A. ALLISON. [L. S.]

Witnesses:
A. C. SPILMAN,
L. D. McMURRAY.